United States Patent
Eglit et al.

(10) Patent No.: US 6,459,426 B1
(45) Date of Patent: Oct. 1, 2002

(54) MONOLITHIC INTEGRATED CIRCUIT IMPLEMENTED IN A DIGITAL DISPLAY UNIT FOR GENERATING DIGITAL DATA ELEMENTS FROM AN ANALOG DISPLAY SIGNAL RECEIVED AT HIGH FREQUENCIES

(75) Inventors: Alexander Julian Eglit, Half Moon Bay; Tzoyao Chan, Saratoga; John Lattanzi, Palo Alto, all of CA (US)

(73) Assignee: Genesis Microchip (Delaware) Inc., Alviso, CA (US)

( * ) Notice: Subject to any disclaimer, the term of this patent is extended or adjusted under 35 U.S.C. 154(b) by 0 days.

(21) Appl. No.: 09/135,216

(22) Filed: Aug. 17, 1998

(51) Int. Cl.⁷ ............................................. H03M 1/12
(52) U.S. Cl. ................... 345/213; 345/204; 345/519; 341/155; 348/5; 348/13; 348/536; 348/537
(58) Field of Search ..................... 341/155; 345/204, 345/213, 519; 348/5, 13, 536, 537

(56) References Cited

U.S. PATENT DOCUMENTS

| | | | |
|---|---|---|---|
| 4,415,985 A | * 11/1983 | McDaniel et al. | 364/900 |
| 5,402,143 A | * 3/1995 | Ge et al. | 345/102 |
| 5,459,510 A | * 10/1995 | Hamalainen | 348/322 |
| 5,739,867 A | * 4/1998 | Eglit | 348/581 |
| 5,793,439 A | * 8/1998 | Takeuchi | 348/584 |
| 5,796,392 A | * 8/1998 | Eglit | 345/213 |
| 5,874,909 A | * 2/1999 | Soenen et al. | 341/141 |
| 6,002,446 A | * 12/1999 | Eglit | 348/581 |

OTHER PUBLICATIONS

Publication Entitled, "Paradise Bridge80–B, Data Sheet, Version 1.15," By Paradise Electronics, Inc., San Jose, California. (1 page).

* cited by examiner

*Primary Examiner*—Bipin Shalwala
*Assistant Examiner*—Vincent E. Kovalick

(57) ABSTRACT

A monolithic integrated circuit for use in a digital display unit. The circuit may include an analog-to-digital converter (ADC), a scaler and a clock recovery circuit. The present invention enables the integration of at least these components into a single monolithic integrated circuit while maintaining reasonable display quality. Specifically, the monolithic integrated circuit is designed for substantial immunity from noise, which may otherwise result from integration.

7 Claims, 6 Drawing Sheets

MONOLITHIC INTEGRATED CIRCUIT IMPLEMENTED IN A DIGITAL DISPLAY UNIT FOR GENERATING DIGITAL DATA ELEMENTS FROM AN ANALOG DISPLAY SIGNAL RECEIVED AT HIGH FREQUENCIES

RELATED APPLICATION

The present application is related to the following co-pending U.S. patent application entitled "A Method and Apparatus for Clock Recovery in a Digital Display Unit", Ser. No. 08/803,824, Filed Feb. 24, 1997, and is incorporated in its entirety into the present application herewith.

BACKGROUND OF THE INVENTION

1. Field of the Invention

The present invention relates to digital display units used in computer systems, and more specifically to integrated circuits for generating digital data elements from an analog display signal received by digital display units.

2. Related Art

Digital display units (e.g., flat panel monitors) are often used to display images encoded in an analog display signal. Digital display units are characterized by screens having discreet points termed "pixels". Each pixel is actuated with different colors and intensities to generate an image. The tasks required to display the images on a screen of a digital display unit can be appreciated by considering the manner in which display signals are typically generated and the format of a typical display signal.

Analog display signals are typically generated by a digital-to-analog converter (DAC) in a graphics source generally located outside of a digital display unit. The DAC generates a portion of a display data signal (e.g., in RGB format) by processing each of several pixel data elements representing an image. Each pixel data element value generally represents the color intensity of a point of the image such that the display data signal represents the overall image frame. A DAC typically generates several such frames in quick succession and sends the resulting display signal to a digital display unit. The DAC is typically driven by a video clock, which determines the frequency at which the pixel data elements are encoded in an analog display signal.

An analog display signal so generated may have synchronization signals associated with the display data. While the display data signal identifies a color intensity for each point of an image, the synchronization signals provide a time reference such that each portion of the display data signal can be correlated with a corresponding portion of the image. In particular, VGA compatible systems generate a HSYNC signal identifying the separation of successive horizontal lines and a VSYNC signal identifying the separation of successive frames.

To display the images encoded in an analog signal, a digital display unit may need to accomplish several tasks. For example, the sampling clock may need to be recovered, the analog display data may need to be sampled using the recovered clock, and the image may need to be scaled (upscaled or downscaled) to use all the space available on a display screen.

Clock recovery is typically required to accurately regenerate the pixel data elements used at a graphics source (generating the analog display signal). That is, when the ADC is driven by an accurately recovered clock (sampling clock), the sampled data elements (generated from sampling) typically equal the pixel data elements used at the graphics source. The sampled data elements may then be used for scaling (to bigger or smaller image in any dimension) the image. The pixel data elements representing the scaled image may be used to generate display signals on a display screen.

Prior systems may implement each of these tasks in a separate integrated circuit (chip) or module. For example, a scaler may be implemented as one integrated circuit and the clock recovery circuit may be implemented as another.

Implementation as different modules or chips may be unacceptable in certain situations. For example, the manufacturing costs may be high. High costs may be unacceptable, particularly in consumer markets where computer systems may be marketed. In addition, a digital display unit may be prone to defects due to the presence of the several modules or chips.

SUMMARY OF THE INVENTION

A monolithic integrated circuit containing an analog-to-digital converter (ADC), a clock recovery circuit and a resizing (scaler) circuit is provided in accordance with the present invention. Integration is enabled while maintaining adequate display quality. In one embodiment described below, the integration of these circuits into one monolithic integrated circuit is facilitated by using digital components for tracking and phase acquisition in the clock recovery circuit and by using only a small memory in the resizing circuit.

According to another aspect of the present invention, a digital-to-analog converter (DAC) is also integrated into the monolithic integrated circuit. The DAC enables color balancing to be achieved for multiple ADCs used for processing multiple colors (e.g, Red, green and blue signals). Color balancing is of particular importance because of any sub-optimal implementation of analog components, which may cause color mismatches when several ADCs are used, each for processing a different color.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

Figure 1:
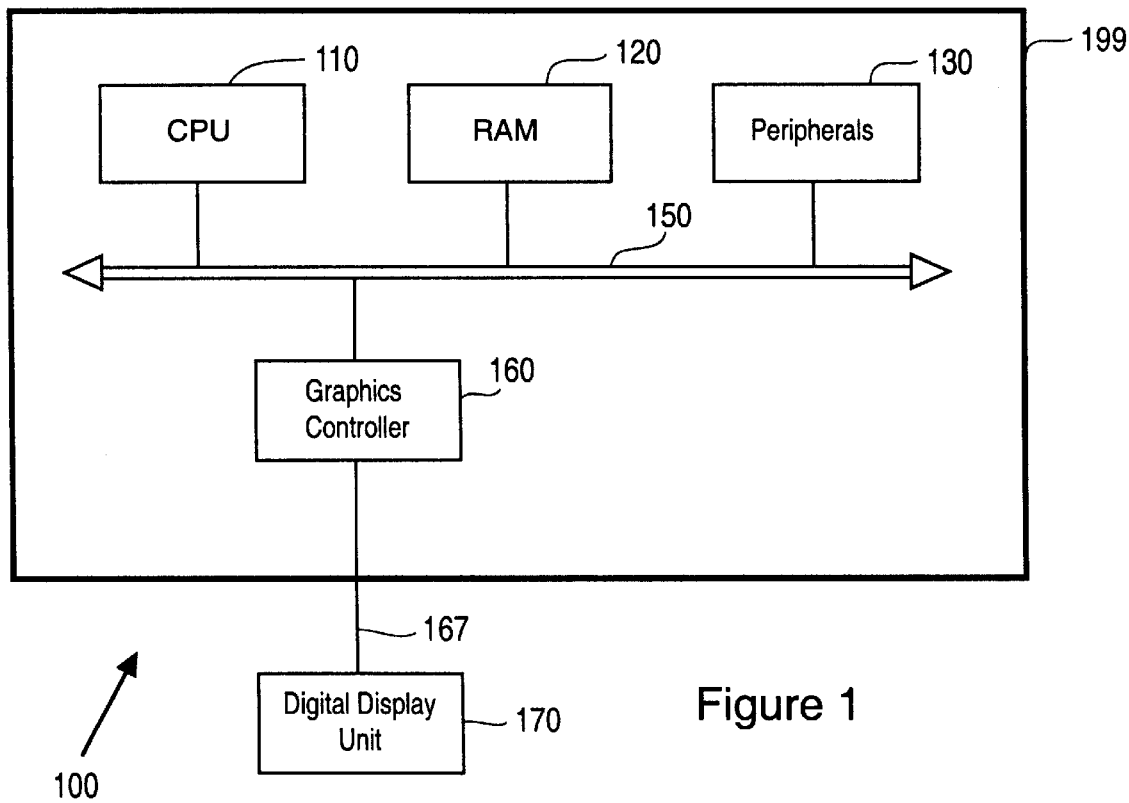
FIG. 1 is a block diagram of a computer system illustrating an example environment for implementing the present invention.

0. Overview and Discussion of the Invention

The present invention provides a single integrated circuit (chip) which performs several tasks such as clock recovery and scaling to generate the pixel data elements from an analog display signal. The generated pixel data elements can be used to display images on a digital display screen. A digital display unit in a computer system may receive analog display signals, and display the images encoded in the received display signals using the integrated circuit provided in accordance with the present invention.

As tasks such as scaling and clock recovery are performed in a single integrated circuit, the present invention provides several advantages. The manufacturing costs in providing an apparatus for displaying images encoded in analog signals may be decreased. In addition, digital display units employing an integrated circuit provided in accordance with the present invention may be less error prone due to the decrease in number of components resulting from the integration.

The present invention is described below with respect to several example embodiments and environments. The features enabling the present invention can be appreciated with an understanding of some of the problems with integration. Accordingly, the problems are described first.

1. The Problems with Integration

Several problems or challenges may be presented in attempts to integrate ADC, scaler and clock recovery circuits. One problem with integration is the ability to display images accurately in the presence of noise. Noise may be present due to one or more of several reasons. For example, such an integrated circuit may need to contain both analog and digital components, and the manufacturing technologies may pose limitations.

As an illustration, analog oriented manufacturing processes may limit the number of gates in the overall chip, making the integration potentially impossible or impracticable. On the other hand, digital oriented manufacturing processes (e.g, CMOS process) may lead to sub-optimal implementation of analog components. Many prior systems may use analog phase lock loops (PLLs) and the analog components (e.g., capacitors) may be implemented, leading to noise.

In addition, the components may be closely located due to any integration. The operation of one component (e.g., digital components) causes noise disturbances for the other (e.g., analog components). As a result, noise is encountered by components due to operation of other components.

Furthermore, the components may use a common substrate used by all the components. The physical connection thus present, may cause noise to be propagated from one component to the other. Ringing noise may also be generated from power source.

Noise is of problem particularly with computer systems in which the amount of time to sample a pixel ("pixel period") is extremely low. To clarify, the pixel or dot frequency (or 1/pixel period) is equal to the refresh rate times the number of horizontal lines times the number of pixels encoded in each horizontal. For a finer display resolution, the number of horizontal lines and the number of pixels have been increasing over the past several years. Similarly, for a better display quality, the refresh rates have also increasingly been higher. As a result, modern digital display units have been forced to operate with analog display signals having increasingly lower pixel period.

Due to the low pixel period, digital display units operating with high-frequency analog display signals are particularly sensitive to noise. Without noise immunity, several display artifacts can be caused in the displays.

As described below in further detail, the present invention enables the integration of several components into a single monolithic integrated circuit while addressing at least the problems of above.

2. Example Environment

In a broad sense, the invention can be implemented in any computer system having a digital display unit such as a flat panel monitor. The present invention is described in the context of a computer system operating in graphics modes such as EGA, VGA and SVGA modes. Such computer systems include, without limitation, lap-top and desk-top personal computer systems, work-stations, special purpose computer systems, general purpose computer systems, network computers, a nd many others. The invention ma y be implemented in hardware, software, firmware, or combination of the like. The above noted graphics modes are described in detail in a book entitled, "Programmer's Guide to the EGA, VGA, and Super VGA Cards", published by Addition-Wesley Publishing Company, by Richard F. Ferraro, ISBN Number 0-201-62490-7, which is incorporated in its entirety herewith.

FIG. 1 is a block diagram of computer system 100 in which the present invention can be implemented. Computer system 100 includes central processing unit (CPU) 110, random access memory (RAM) 120, one or more peripherals 130, graphics controller 160, and digital display unit 170. CPU 110, RAM 120 and graphics controller 160 are typically packaged in a single unit, and such a unit is referred to as graphics source 199 as an analog display signal is generated by the unit. All the components in graphics source 199 of computer system 100 communicate over bus 150, which can in reality include several physical buses connected by appropriate interfaces.

RAM 120 stores data representing commands and possibly pixel data representing a source image. CPU 110 executes commands stored in RAM 120, and causes different commands and pixel data to be transferred to graphics controller 160. Peripherals 130 can include storage components such as hard-drives or removable drives (e.g., floppy-drives). Peripherals 130 can be used to store commands and/or data which enable computer system 100 to operate in accordance with the present invention. By executing the stored commands, CPU 110 provides the electrical and control signals to coordinate and control the operation of various components.

Graphics controller 160 receives data/commands from CPU 110, generates analog display signals including display data and corresponding synchronization signals, and provides both to digital display unit 170. Graphics controller 160 can generate an analog display signal in the RS-170 standard with RGB signals in one embodiment. In that embodiment, the analog display signal is in the form of RGB signals and the reference signal includes the VSYNC and HSYNC signals well known in the relevant arts. Therefore, three analog display signals (red, green and blue) are generated from each pixel data element.

For conciseness, the present invention is described with reference to one display data signal. It should be understood that the description may be applicable to all the three display data signals. It should be further understood that the present invention can be implemented with analog image data and/or reference signals in other standards even though the present description is provided with reference to RGB signals. Examples of such standards include composite sync standard usually implemented on Macintosh Computer Systems and Sync on Green standard.

In general, graphics controller 160 first generates pixel data elements of a source image with a predefined width and height (measured in terms of number of pixel data elements). The pixel data elements for a source image may either be provided by CPU 110 or be generated by graphics controller 160 in response to commands from CPU 110. Graphics controller 160 typically includes a digital to analog converter (DAC) for generating an analog display signal based on the pixel data elements in a known way. The DAC generates the analog display signal under the control of a video clock.

Digital display unit 170 receives an analog display signal from graphics controller 160, and displays the image frames encoded in the received display signal. A single integrated circuit is provided in accordance with the present invention for performing several tasks. The integrated circuit may generate digital data elements, based on which display signals may be generated on a digital display screen as described in further detail below.

3. Digital Display Unit

Figure 2:
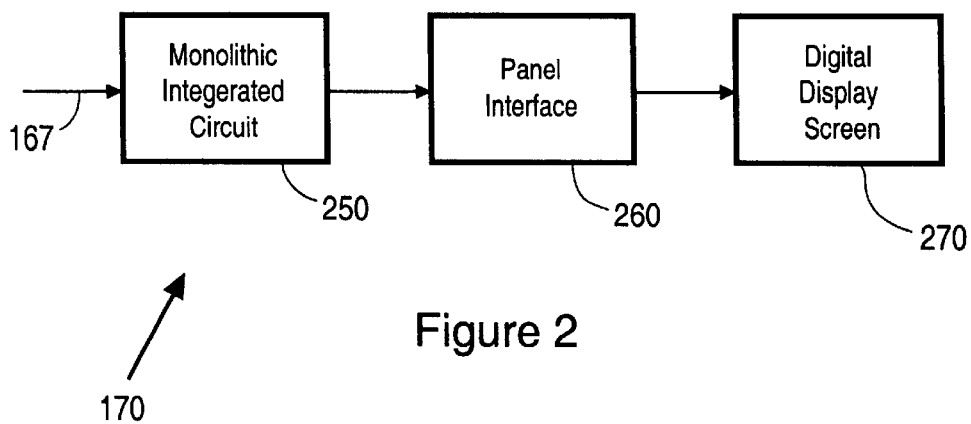
FIG. 2 is a block diagram of a digital display monitor illustrating the manner in which the present invention can be employed in displaying images encoded in a received analog display signal.

FIG. 2 is a block diagram of digital display unit 170 illustrating an embodiment in accordance with the present invention. Digital display unit 170 can include monolithic (single) integrated circuit 250, panel interface 260 and digital display screen 270. Each block is described below in further detail.

Monolithic integrated circuit 250 receives an analog display signal on line 167 and generates pixel data elements, based on which display signals may be generated on digital display screen 270. Monolithic integrated circuit 250 may generate a sampling clock (clock recovery) synchronized with the received synchronization signals, scale the image if necessary, and provide the resultant pixel data elements to panel interface 260.

Digital display screen 270 may include several rows, with each row including several pixels. An image is generated by actuation of the pixels as is well known in the relevant arts. Panel interface 260 may provide the necessary signals for actuation of the pixels. Panel interface 260 generally depends on the implementation of digital display screen 270. Digital display screen 270 and panel interface 260 may be implemented in a conventional manner. An embodiment of monolithic integrated circuit 250 is described below in further detail.

4. Monolithic Integrated Circuit

Figure 3A:
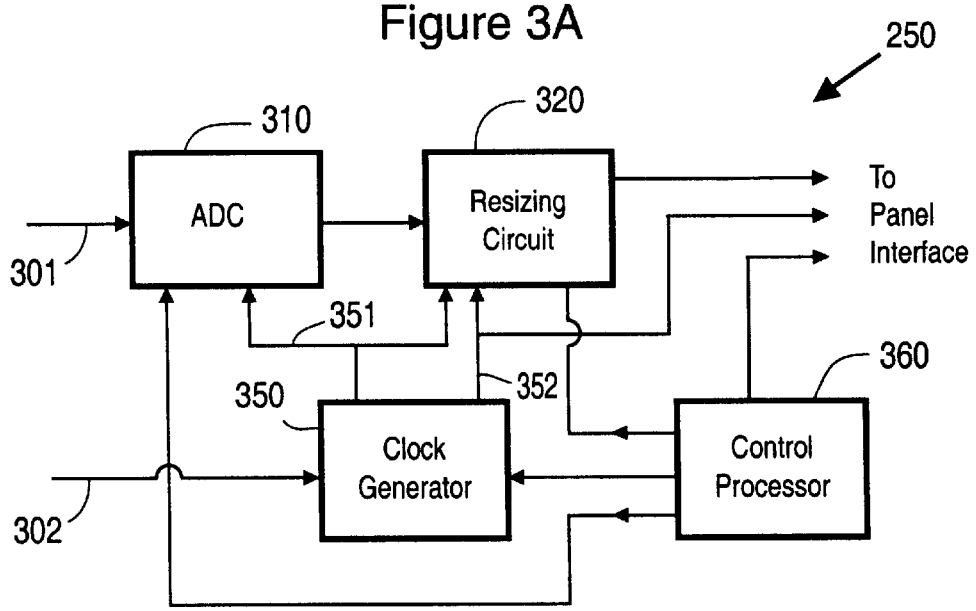
FIG. 3A is a block diagram illustrating the internal details and operation of a monolithic integrated circuit in one embodiment of the present invention.

The details of an embodiment of monolithic integrated circuit 250 are illustrated with reference to FIG. 3A. Monolithic integrated circuit 250 may include ADC 310, resizing circuit 320, clock generator 350 and control processor 360. Control processor 360 coordinates and controls the operations of all the block. The remaining blocks are described in detail below.

Clock generator 350 receives horizontal synchronization signals (HSYNC) on line 302, and generates SCLK (sampling clock) signal 351 and DCLK signal 352. The two clock signals may be synchronized with the synchronization signals received on line 302. Clock generator 350 may be implemented as a direct digital synthesizer based digital PLL, with the phase and frequency acquisition determined by the digital components. As monolithic integrated circuit may be implemented using digital oriented processes such as CMOS, the clock synthesizer may be optimally manufactured.

An embodiment of clock generator 350 is described in the co-pending United States Patent Application entitled "A Method and Apparatus for Clock Recovery in a Digital Display Unit", naming as inventor Alexander J. Eglit, Ser. No. 08/803,824, Filed Feb. 24, 1997, and is incorporated in its entirety into the present application herewith.

ADC 310 samples analog display data received on line 301 using a sampling clock received on SCLK signal 351. Lines 301 and 302 may be contained in line 167 of FIG. 1. Only one ADC is shown in FIG. 3A for conciseness. In case the received analog display signals contain RGB signals, a corresponding number of ADCs may be employed in monolithic integrated circuit 250 as described in further detail below with reference to FIG. 3B.

Resizing circuit 320 receives the sampled data elements on line 312 from ADC 310, and upscales or downscales the image represented by the sampled data elements. Resizing circuit 320 may use clock signals from clock generator 350 for performing the resizing operation. For ease of manufacturing, resizing circuit 320 may need to operate using minimal memory space. Embodiments satisfying such a requirements are described in U.S. Pat. No. 5,739,867, entitled, "A Method and Apparatus for Upscaling an Image", issued on Apr. 4, 1998, and naming as inventor Alexander J. Eglit, which is incorporated in its entirety into the present application.

The embodiments in that Patent may perform upscaling while using memory as small as that required to store pixel data elements representing only two lines. Using more memory may simplify the implementation of upscaling operation, but present manufacturing challenges. With the advances in manufacturing technologies, monolithic integrated circuit 250 in accordance with the present invention may be implemented to include larger memories also.

Resizing circuit 320 generates pixel data elements as a result of the resizing operation. The pixel data elements representing the resized image are provided to panel interface 260 of FIG. 2. Clock generator 352 and control processor 360 may provide the necessary and clocking and control signals to panel interface 260 to cause panel interface 260 to display the resized images on digital display screen 270.

Thus, a monolithic integrated circuit to provide pixel data elements representing resized images can be provided in accordance with the present invention. Manufacturing and implementation of several embodiments of monolithic integrated circuits (including the one described above) in accordance with the present invention will be apparent to one skilled in the relevant arts.

Another aspect of the present invention enables multiple ADCs typically present in monolithic integrated circuits to be calibrated as described below in further detail. The calibration may be important for a good display quality as the manufacturing of analog components may be sub-optimal resulting in resistance mismatches in ADCs.

5. Calibration of ADCs

Figure 3B:
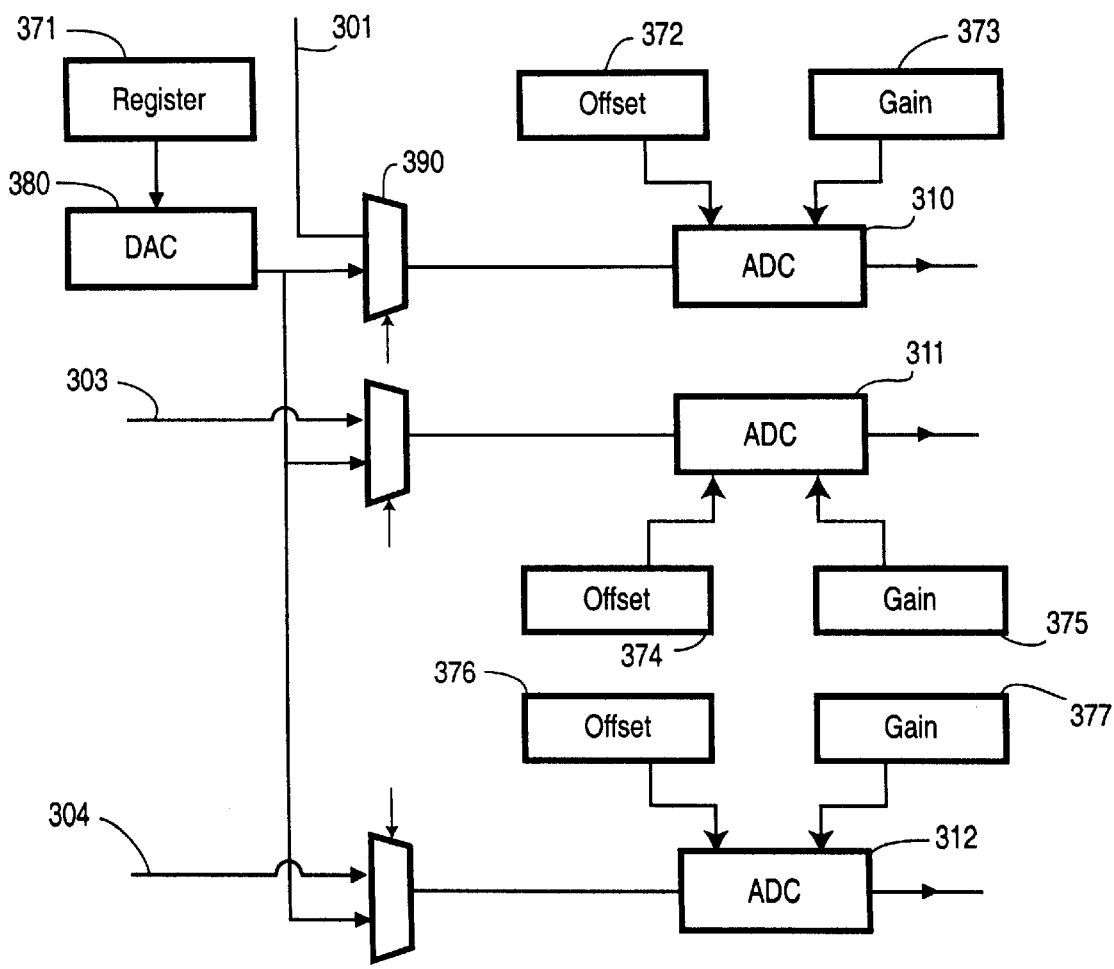
FIG. 3B is a block diagram illustrating additional detail of a monolithic integrated circuit in an embodiment of the present invention.

FIG. 3B illustrates additional components of monolithic integrated circuit 250 illustrating the need to calibrate multiple ADCs which may be present in a digital display unit. For illustration, it will be assumed that a received display signal includes three colors (Red, Green and Blue) on three separate lines 301, 303 and 304. The three colors are respectively processed using three ADCs 310, 311 and 312.

In general, it is desirable that the three ADCs 310, 311 and 312 generate the same digital output value given the same voltage level as input. Such a requirement may be referred to as achieving 'color balance'. Achieving color balance typically leads to a better image quality on display screens. Broadly, color balancing is achieved by setting the offset (372, 374 and 376) and gain (373, 375 and 377) registers to appropriate values. The manner in which color balance can be achieved is described mostly with reference to ADC 310 and multiplexor 390 for conciseness.

Processor 360 (shown only in FIG. 3A) first loads a value of 0 into register 371. In response, DAC 390 may ideally need to generate a voltage level of zero. Processor 360 causes multiplexor 390 to select the output of DAC 380. It may be noted that the same signal (output of DAC 380) is generated as input to all ADCs 310-312. Ideally, all the ADCs need to generate the same output of zero. In normal mode, processor 360 causes the RGB signals received from an external graphics source to be provided as inputs to the ADCs.

Processor 360 may examine the output(s) of ADC 310 and set offset register 372 value until ADC 310 generates a value of zero. The manner in which processor 360 may change offset register 372 in an embodiment is described in further detail below. Each offset register 372, 374, and 376 may be set independently.

Once offset registers 372 are set properly, the processor 360 may attempt to set gain registers 373, 375 and 377 to proper values. To set the gain registers to proper values, processor 360 may first store a values of all-ones in register 371. In response, DAC 380 may generate an output corresponding to maximum brightness (e.g., 0.7 Volts). Processor 360 may cause the output of DAC 380 to be provided to all ADCs 310-312. Processor 360 varies each gain register until each the corresponding ADC generates an output of all ones.

Once the offset and gain registers are accurately set, the ADCs typically generate the same output value given the same voltage level on the corresponding input. The manner in which the gain and offset registers may be set in an embodiment is described in further detail below.

6. ADC

The details of implementation of an embodiment of ADC 310 is illustrated with reference to FIG. 4. For illustration, ADC 310 is assumed to be generating an eight bit output. Track/hold 410 takes a sample of the analog signal received on the input line and holds the output voltage constant to enable ADC 440 to take a sample. ADC 440 generates a five bit output, with the five bits representing the most significant bits (MSB). The five bits are provided as an input to error correction block 480.

Track/hold 430, adder 460, and DAC 450 operate to generate the difference of the voltage levels of a sample (now stored in Track/hold 430) and the voltage level represented by the 5-bit MSB output of ADC 440. ADC 470 generates a 4-bit sample of the analog output of adder 460. The operation of all the blocks within ADC 310 may be controlled by internal clock 495. Internal clock 495 may receive SCLK signal 351 and generate clock signals with different phases. The connection between internal clock 495 and other blocks are not shown in the diagrams for clarity.

Dither DAC 420 further enhances noise immunity by taking advantage of the low pass filter characteristics generally inherent in human-eye and digital displays. The effect of dithering is to make noise less perceivable. In addition, dithering improves linearity by removing quantization level uncertainty. The general effect may be to introduce high frequency modulation of output values.

Error correction block 480 examines the nine bits of inputs, and generates an eight bit sample data value, an overflow bit, and an underflow bit in a known way. An underflow situation represents a situation when ADC 310 has received a voltage level below that corresponding to an output value of zero. The overflow bit indicates a situation when the input sample (provided by Track/hold 410) has a voltage level greater than that represented by an output value of 255. The manner in which the overflow and underflow bits can be used for color balancing is described below with respect to FIGS. 5 and 6.

Figure 4:
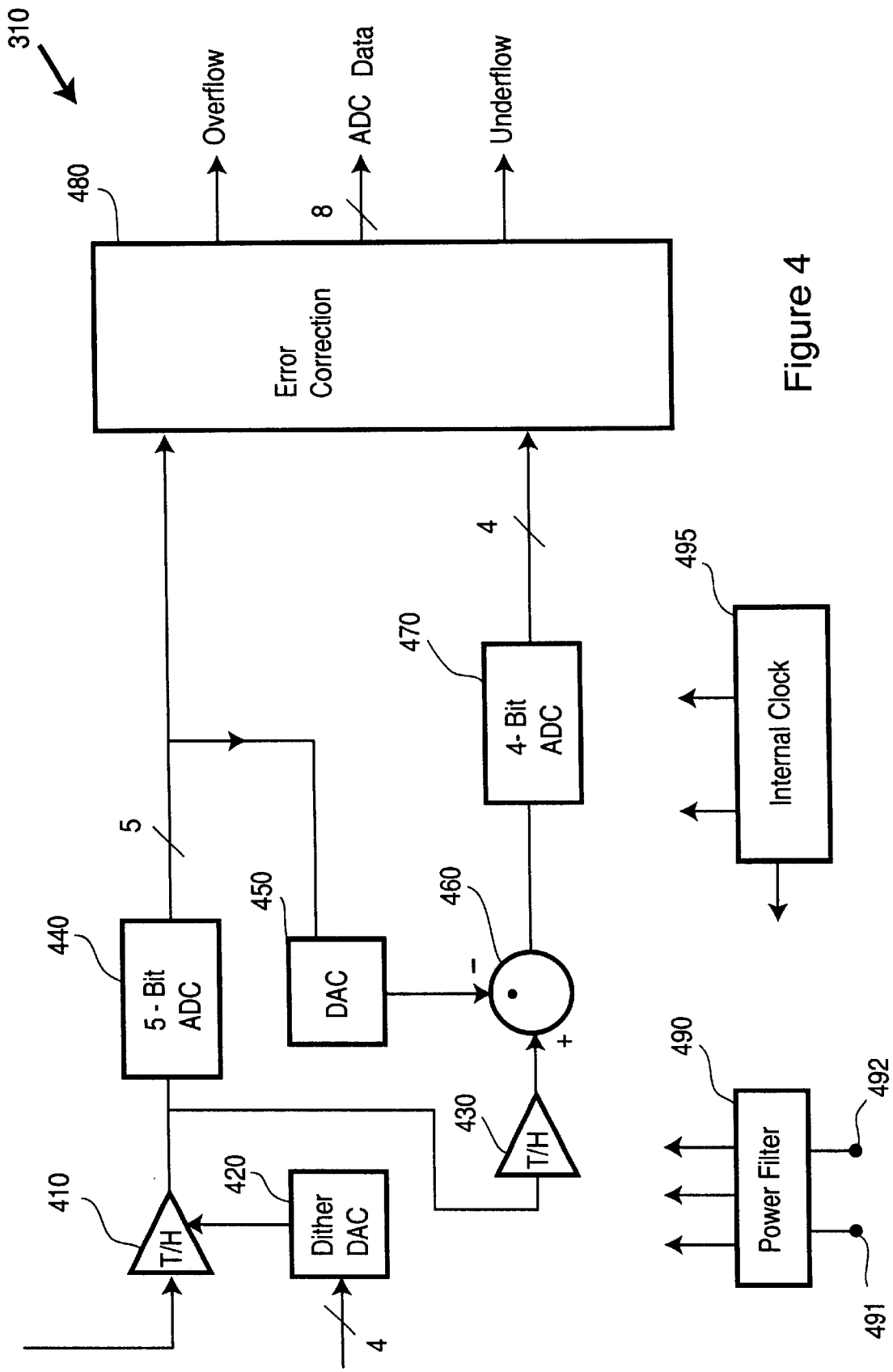
FIG. 4 is a block diagram illustrating the internal structure and operation of an ADC in one embodiment.

Continuing with reference to FIG. 4, one challenge with the design of monolithic integrated circuits for operation with high bandwidth analog display signals is noise from external sources. One such source is the external power source. There can potentially be ringing noise, which can be problematic as is well known in the relevant arts.

Power filter 490 may eliminate such undesirable noise. Power filter 490 is connected to a power source (not shown) via pins 491 and 492, and reduces or eliminates any noise in the power supply and provides the filtered power to various blocks of the ADC 310. An embodiment of power filter 490 is illustrated with reference to FIG. 7.

Figure 7:
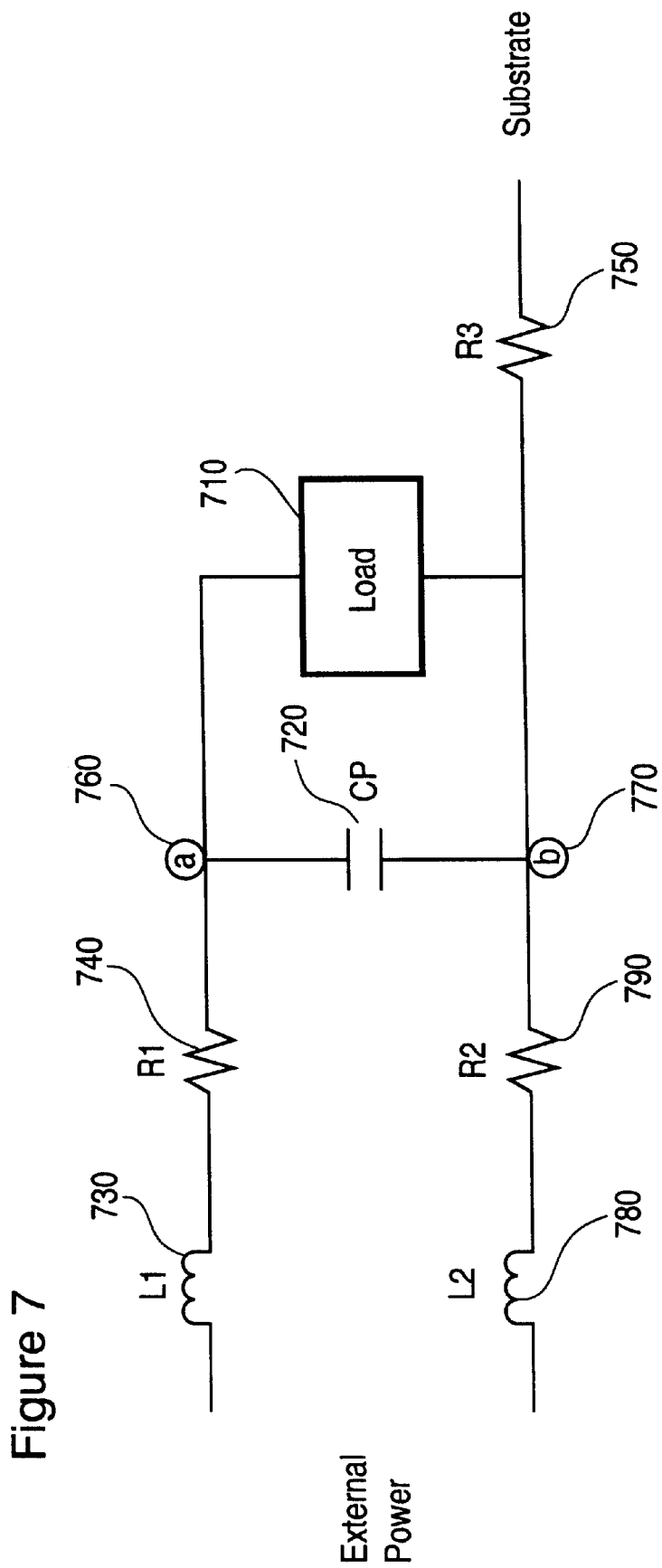
FIG. 7 is a block diagram of a power filter in an embodiment.

With reference to FIG. 7, the load draws dynamic power from the external power. This can cause the power system made up of L1, L2, R1, R2, Cp to oscillate. This noise is in the substrate which will effect other circuits. In FIG. 7, L1 and L2 represent package and bond wire inductance; R1 and R2 Package, bond wire, and on chip metal resistance; Cp On chip bypass capacitance; and R3 represents Substrate resistance between different circuit blocks.

Increasing R is generally effective in removing ringing, but may need to be used carefully because any voltage drop across R reduces the supply voltage to the load. Cp is effective for decreasing the Q and the peak power supply disturbance. It also helps filter the substrate noise from other blocks thru R3. The ringing will be at w$\sim$=1/((LC)*0.5), wherein "$\sim$=" represents approximately equal to. This frequency will be unrelated to the system operating frequency causing noise to alias into the system passband. For this equivalent circuit the Q$\sim$=((L/Cp)t*0.5)/R; L=L1+L2 R=R1+R2, Cp represents any on chip capacitance.

Usually dominated by n-well to substrate capacitance of the p-channel circuit devices. It is in the tens of picofarad range. Cp is implemented with an N-channel in the N-well instead of the substrate. The negative side of the capacitor is the n-channel's source and drain and also the n-well. It only connects to the substrate (which is ground), at the normal n-channel circuit substrate connections. This is because the area represented by this capacitor can be quite large. This physical spacing is an effective way of keeping noise isolated between different circuit blocks on the same chip. Thus, by increasing the filtering capabilities by increasing Cp, one may physically separate the circuit blocks, thereby reducing noise.

The manner in which the overflow and underflow signals can be used for color balancing is described now.

7. Setting the offset register

The manner in which the offset register can be set is described with reference to FIG. 5. In step 520, DAC register 371 may be set to 0, count may be set to zero, and offset register 372 may be set to some intermediate value, e.g., 128. The outputs generates by ADC 310 is examined in step 530. If the underflow output is set, the offset register is incremented, preferably by one. The increment operation causes ADC 310 to lower the voltage level corresponding to an output of zero.

If no underflow in detected in step 540, the offset register is decreased in step 560. For fast convergence, the offset register may be decreased by a small number. Steps 530, 540 and 560 are repeated until either an underflow is detected in step 540 or until a pre-set maximum number of iterations are performed. To keep track of the number of iterations, count is incremented in step 570, and compared with a preset maximum value in step 580. Typically, after a few iterations, underflow is generally encountered.

Figure 5:
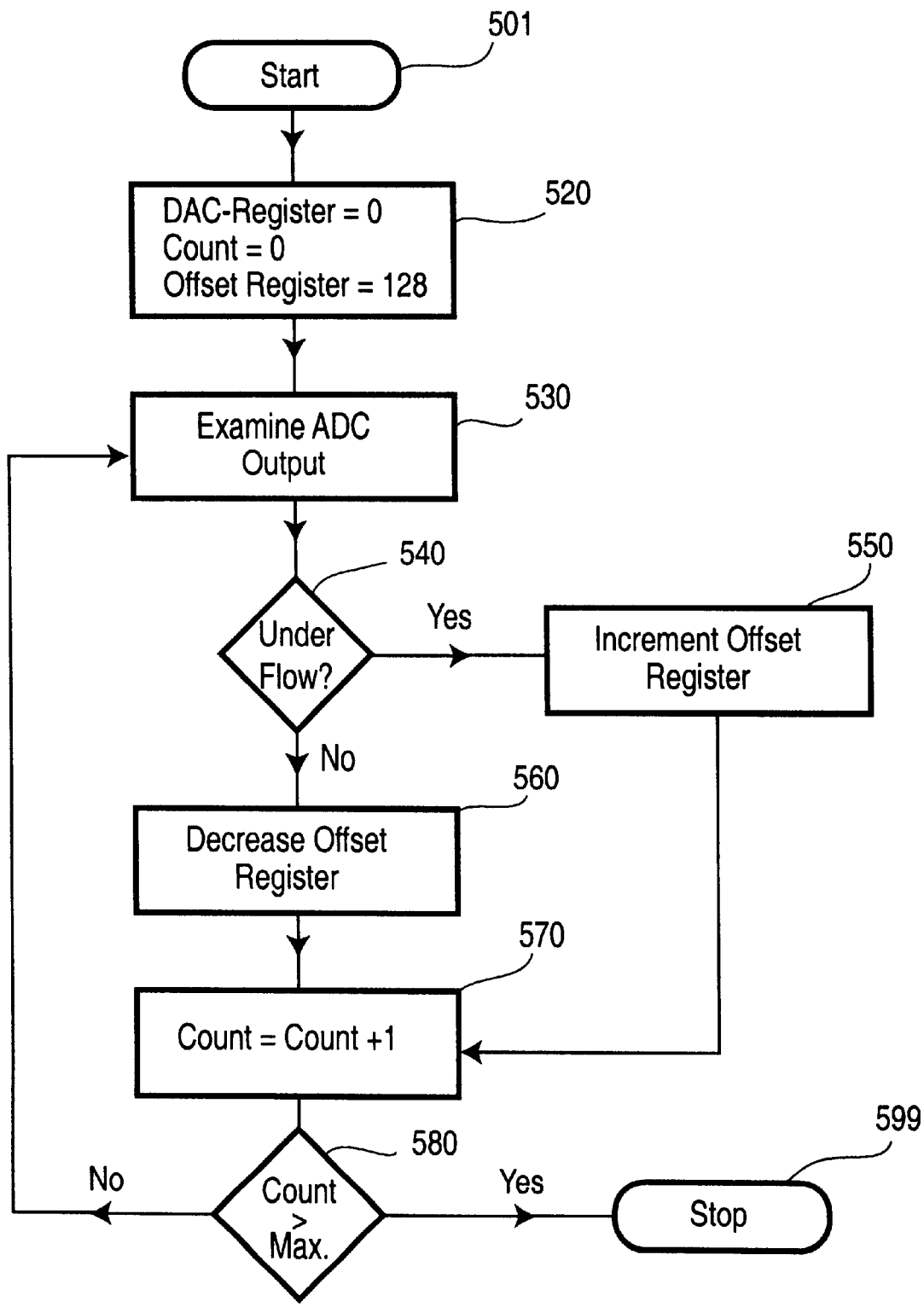
FIG. 5 is a flow-chart illustrating a method of setting an offset register used in an ADC while achieving color balancing in accordance with the present invention.

By setting the off-set registers of each ADC to a corresponding proper value in accordance with the flow-chart of FIG. 5, the present invention ensures that all the ADCs generate a value of zero for the same voltage level at the corresponding input. The manner in which the gain (or full-scale) register 373 may be set is described below with reference to FIG. 6.

7. Setting Gain Register

Figure 6:
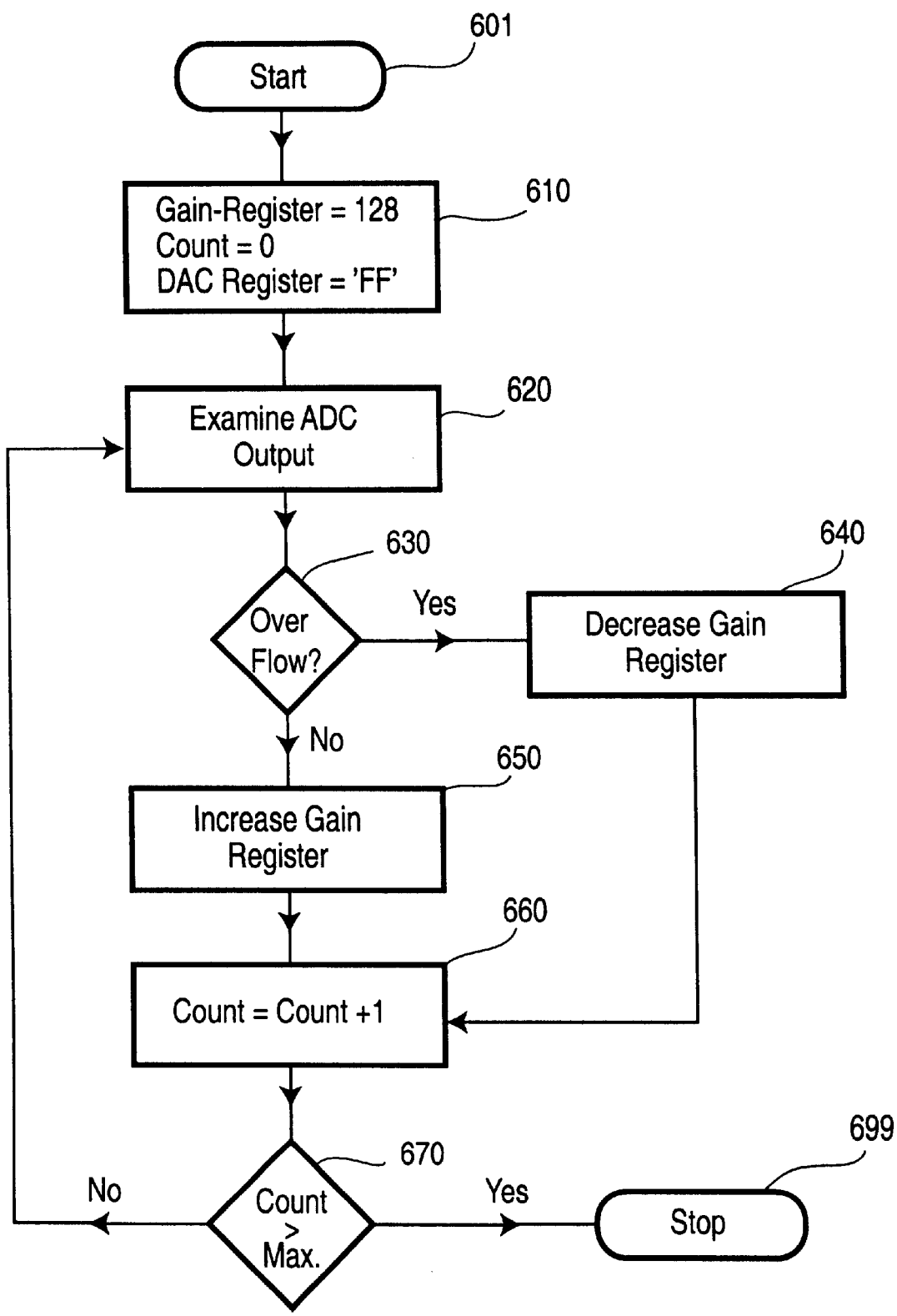
FIG. 6 is a flow-chart illustrating a method of setting a gain register used in an ADC while achieving color balancing in accordance with the present invention.

FIG. 6 is a flow-chart illustrating a method of setting gain register 373 accurately. In step 610, gain register 373 may be set to an intermediate value (e.g, 128) in the output range of ADC 310, count may be set to zero, and DAC register 371 may be set to all ones (FF). As noted above, the FF values cause DAC 380 to generate approximately the maximum voltage level in the output voltage range, and this maximum voltage signal is passed to track/hold blocks in ADCs.

In step 620, the output of each ADC is examined to determine if the overflow output bit is set. If the overflow bit is determined not to be set (which is usually the case in the first few iterations), the value in gain register 373 is increased, preferably by a small number to facilitate a fast convergence to the correct value. Steps 620, 630 and 650 may generally be repeated until overflow is detected, in which situation, it may be determined that the gain register has been increased to a higher value than required. Accordingly, gain register 373 is decremented to correct the over-adjustment.

Even though the description of above is provided with respect to calibration at the lowest and highest color intensity levels, it should be understood that similar calibration can be performed at intermediate levels also. Thus, using the embodiments of above, the present invention enables a monolithic integrated circuit to be provided which can generate pixel data elements representing resized images in a cost-effective manner for a digital display unit.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A monolithic integrated circuit for use in a digital display unit, wherein said monolithic integrated circuit receives an analog display signal encoded with a plurality of images, said analog display signal comprising display data signal and associated synchronization signals, said monolithic integrated circuit generating a plurality of pixel data elements for display on a digital display screen contained in said digital display unit, said monolithic integrated circuit comprising:

a clock generator circuit for generating a sampling clock synchronized with said synchronization signals;

an analog to digital converter (ADC) for receiving said display data signal and sampling said display data signal according to said sampling clock to generate a plurality of sampled data elements representing an image encoded in said display data signal: and an scaler for scaling said image by processing said plurality of sampled data elements to generate a plurality of pixel data elements, wherein said plurality of pixel data elements are used to display said scaled image on said digital display screen, and wherein said scaler is implemented to use no more memory than two lines of said scaled image, wherein said lesser memory enables said scaler to be integrated into said monolithic integrated circuit.

2. A display unit for displaying a plurality of images encoded in an analog display signal, said analog display signal comprising a display data signal and associated synchronization signals, said display unit comprising:

a display screen;

a panel interface coupled to said display screen; and a monolithic integrated circuit generating a plurality of pixel data elements for display on said display screen, said monolithic integrated circuit comprising:

a clock generator circuit for generating a sampling clock synchronized with said synchronization signals;

an analog to digital converter (ADC) for receiving said display data signal and sampling said display data signal according to said sampling clock to generate a plurality of sampled data elements representing an image encoded in said display data signal; and a scaler for scaling said image by processing said plurality of sampled data elements to generate a plurality of pixel data elements, wherein said panel interface uses said plurality of pixel data elements to display said scaled image on said digital display screen, and wherein said scaler is implemented to use no more memory than two lines of said image, and wherein said lesser memory enables said scaler to be integrated into said monolithic integrated circuit.

3. A self-calibrating monolithic integrated display circuit, comprising:

a plurality of analog to digital converters (ADCs), each ADC having a color balance register, and each ADC converting in accordance with its respective color balance register;

a single digital to analog converter (DAC), having a DAC register connected to said DAC, said DAC generating an output signal in accordance with the contents of the DAC register; and a multiplexor, having a plurality of input pairs, each pair comprising a DAC input from said DAC and a display input from an external display signal, said multiplexor capable of simultaneously directing only the external display signal to said plurality of ADCs, and said multiplexor also capable of multiplexing only the DAC input to said plurality of ADCs.

4. The circuit according to claim 3, further comprising a control processor connected to said multiplexor, the DAC register, and each of the ADC color balance registers, said control processor calibrating the first ADC by directing said multiplexor to direct the DAC input to the first ADC, setting the DAC register to a base value, and setting the color balance register of the first ADC according to both the base value and a resulting output voltage of the first DAC.

5. The circuit according to claim 4, wherein during the calibrating of the first ADC, said control processor sets the color balance register of the first ADC such that the output voltage of the first ADC is essentially equal to the base value.

6. The circuit according to claim 4, wherein said control processor performs the calibrating on each ADC and its associated color balance register.

7. The circuit according to claim 4, further comprising a timing recovery component that recovers the timing of the external source signal and supplies the timing to a clock component that drives the circuit.

* * * * *